Figure 6:
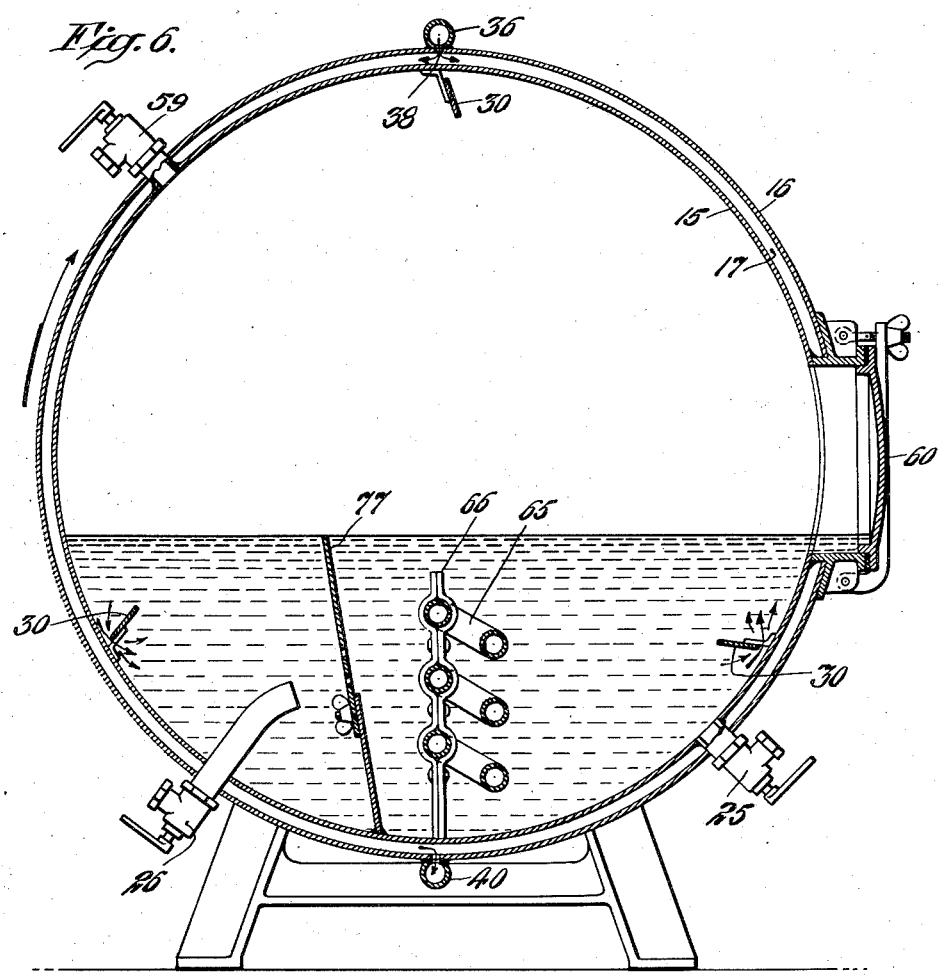

May 31, 1938.  W. PAGE ET AL  2,119,347
APPARATUS FOR TREATING LIQUIDS
Original Filed Sept. 13, 1934  6 Sheets-Sheet 1
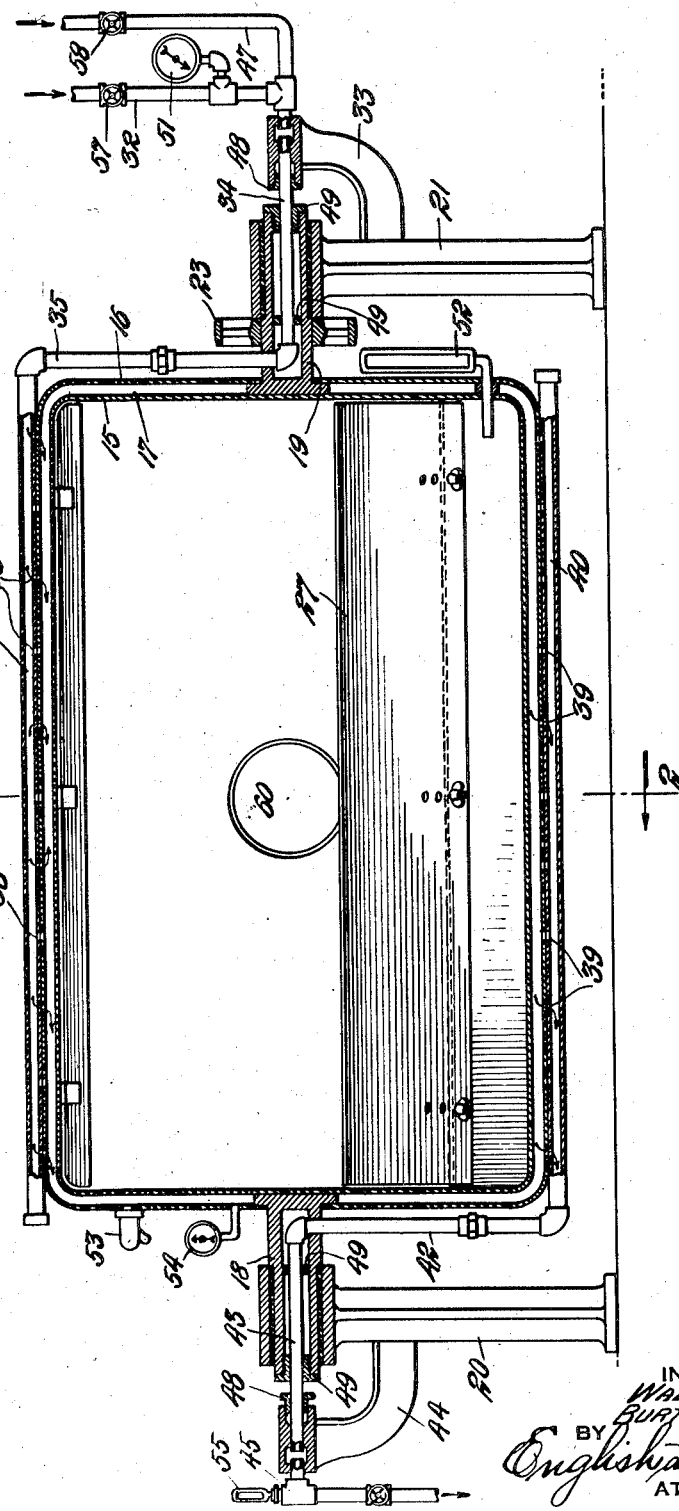
INVENTORS
WALTER PAGE
BURT E. TAYLOR
BY Englishman Studwell
ATTORNEYS

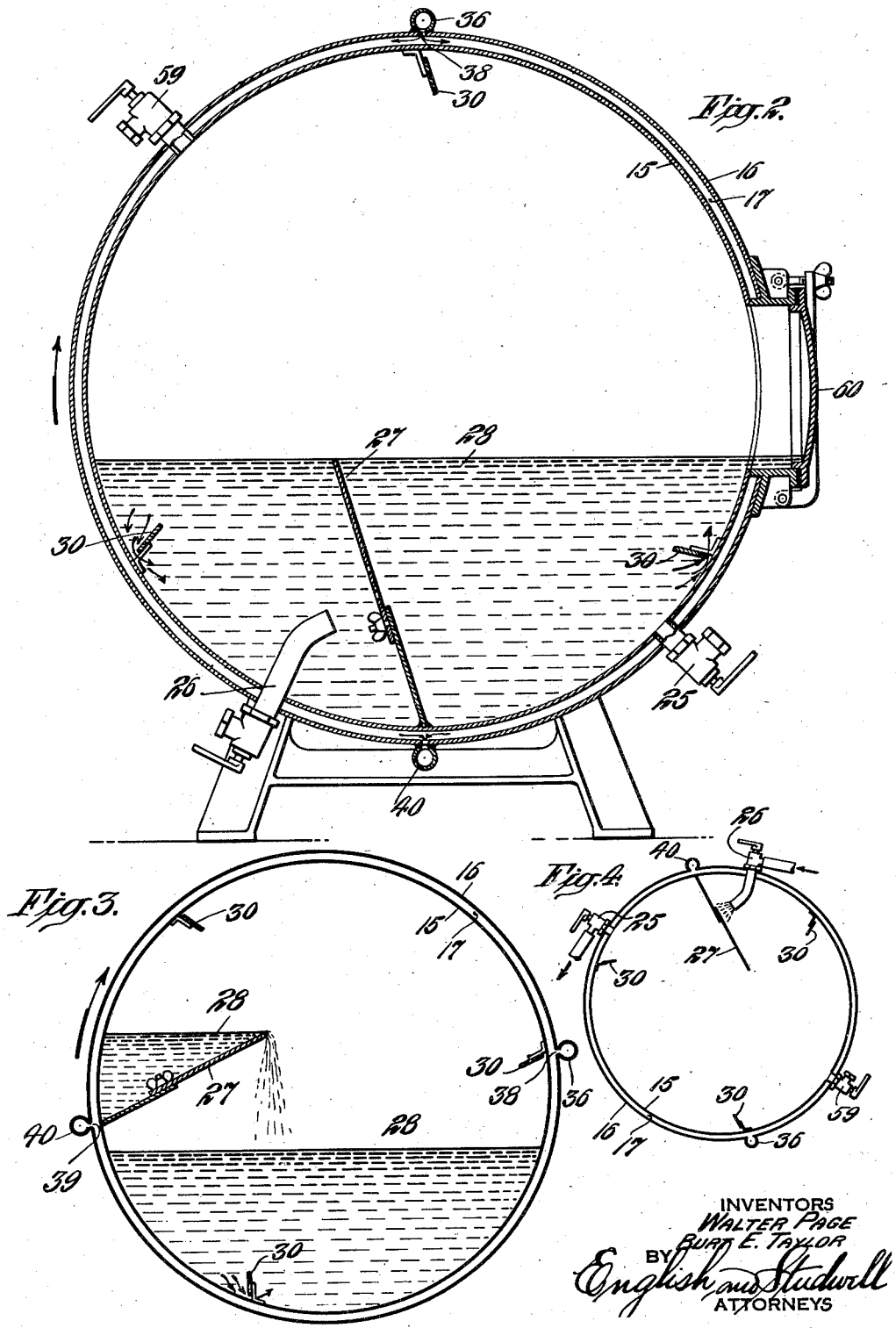

May 31, 1938. W. PAGE ET AL 2,119,347
APPARATUS FOR TREATING LIQUIDS
Original Filed Sept. 13, 1934 6 Sheets-Sheet 3
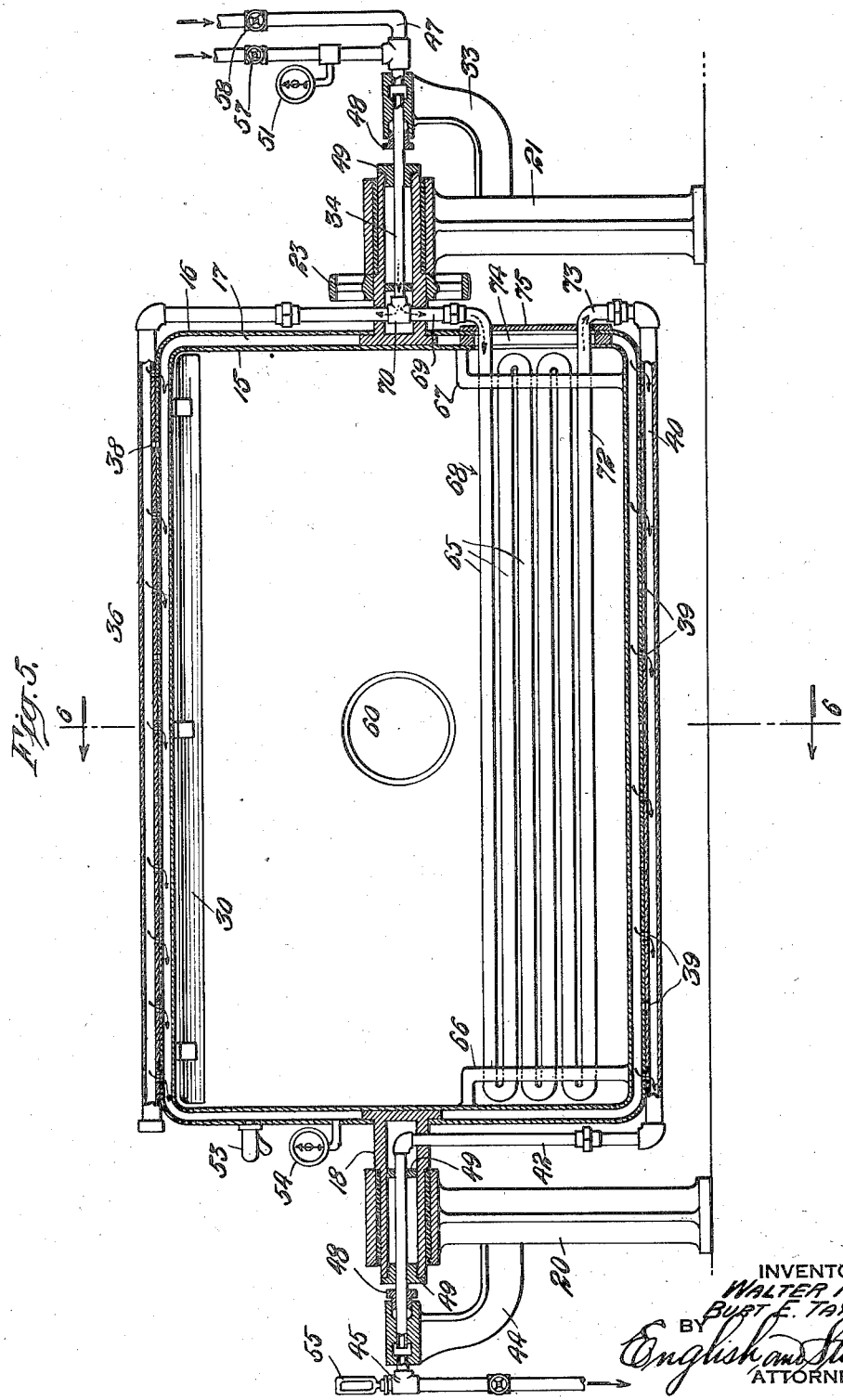
INVENTORS
WALTER PAGE
BURT E. TAYLOR
BY English and Studwell
ATTORNEYS May 31, 1938. W. PAGE ET AL 2,119,347
APPARATUS FOR TREATING LIQUIDS
Original Filed Sept. 13, 1934 6 Sheets-Sheet 4

INVENTORS
WALTER PAGE
BURT E. TAYLOR
BY
ATTORNEYS

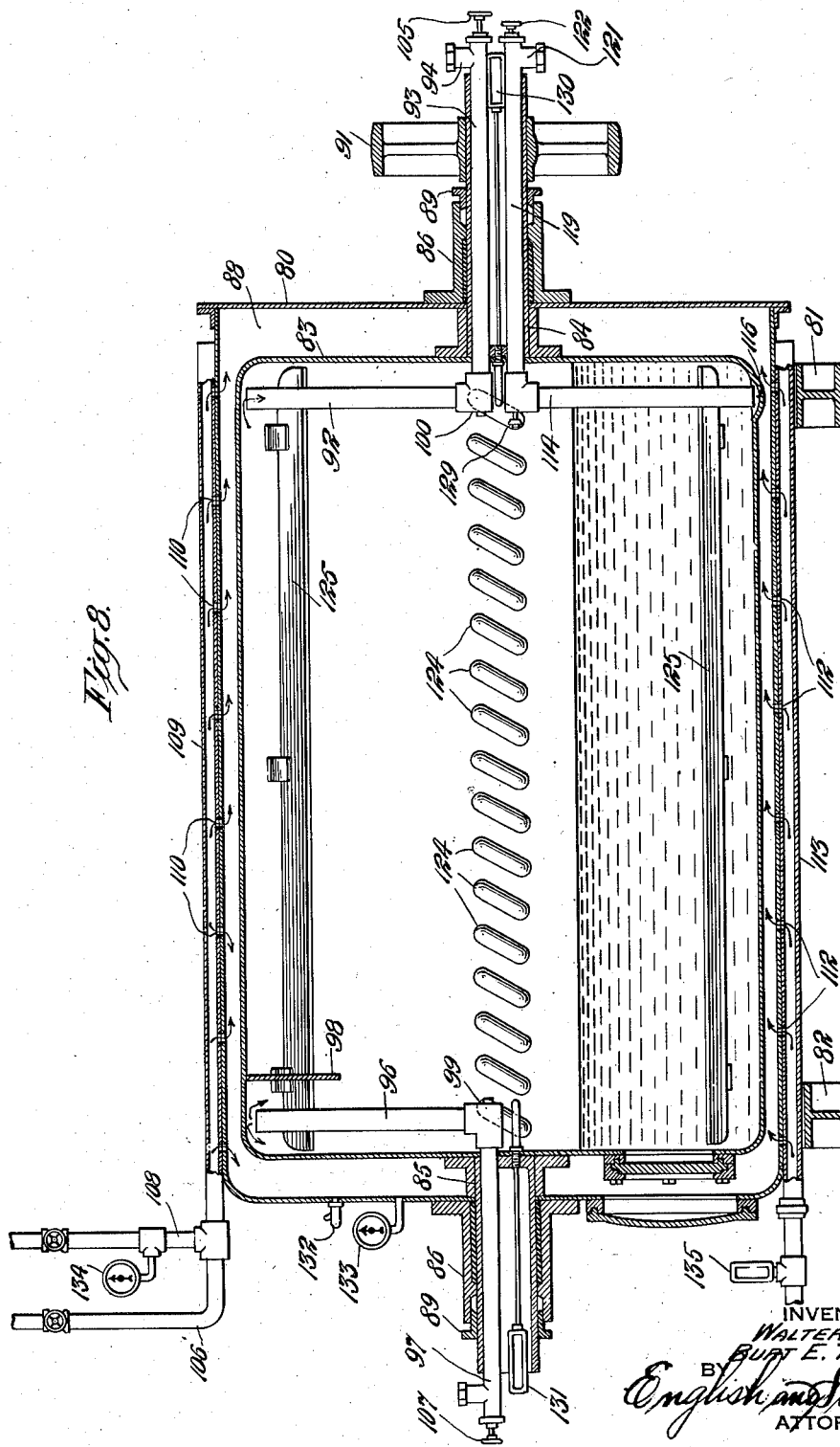

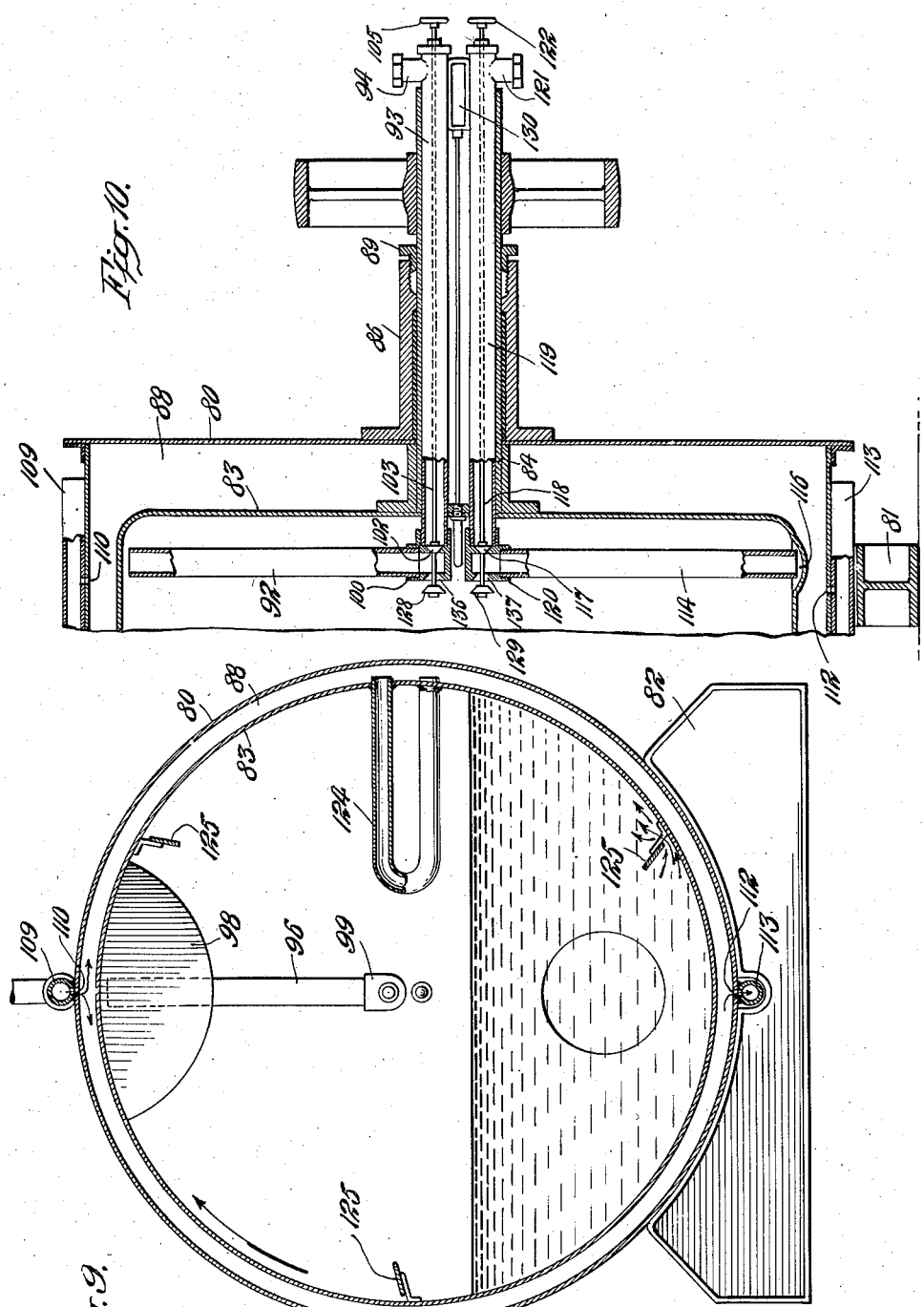

Patented May 31, 1938

2,119,347

UNITED STATES PATENT OFFICE 2,119,347

APPARATUS FOR TREATING LIQUIDS

Walter Page, Scarsdale, and Burt E. Taylor, Mount Vernon, N. Y., assignors to The Borden Company, New York, N. Y., a corporation of New Jersey Original application September 13, 1934, Serial No. 743,806. Divided and this application October 15, 1936, Serial No. 105,838

7 Claims. (Cl. 257—89)

The present invention relates to an improvement in apparatus for sterilizing and pasteurizing liquids, such as milk, beer, and the like. Although the invention is applicable to the treatment of various liquids, it has been developed more especially in connection with the sterilization and pasteurization of milk, and in the following description milk will be referred to as the liquid under treatment, but it will be understood that the invention is not to be restricted to the treatment of milk.

The present application is a division of our copending application, Serial No. 743,806, filed September 13, 1934.

It is well known that sterilized and pasteurized milk has a cooked flavor, especially sterilized evaporated milk. This cooked flavor is due to the oxidation of the butter fats in the presence of the high heat required for the destruction of the deleterious micro-organisms contained in the milk. Many efforts, commercial and patented, have been made to produce sterilized and pasteurized milk retaining the natural flavor and aroma of fresh raw milk. Thus far these efforts have been only partially successful. The object of the present invention is to provide a novel device for sterilizing and pasteurizing milk whereby all the natural flavor and aroma will be contained in the milk.

To the accomplishment of this object the invention consists in providing apparatus for heating and agitating the milk or other fluid while subjecting it to a high vacuum, and then while the milk is still under vacuum, cooling it. In practicing the method carried out in the novel apparatus, a high vacuum—from between 29 to 29.9 inches—is drawn in a chamber previous to introducing the milk therein. The vacuum continues to be drawn while the milk is being fed into the chamber in the form of a spray. The vacuumizing means is then shut off. The chamber is then rotated to thoroughly agitate the milk and break it up into small particles, so that all the air will be extracted therefrom by the vacuum. The chamber is again connected with the vacuumizing means until the high vacuum is again reached in the chamber. Thereupon the chamber is disconnected from the vacuumizing means and rotated while its outer surface is heated by steam or other medium to bring the milk up to the required temperature, say from 143° F. to 265° F., depending upon the amount of pasteurization and sterilization desired. When the requisite sterilization of the milk has been accomplished, which requires from a few seconds to about 30 minutes, the heating means is shut off and cold water or other cooling medium is applied to the surface of the chamber to cool the milk down to a degree at which it can be transferred either into a storage tank or into cans. By reason of the fact that the heating and cooling of the milk is accomplished under a high vacuum the time required for the heating and cooling is greatly reduced over former practices and since there is substantially no oxygen whatever in the milk no oxidation of the butter fats can take place and the milk retains its natural flavor and aroma.

Figure 7:
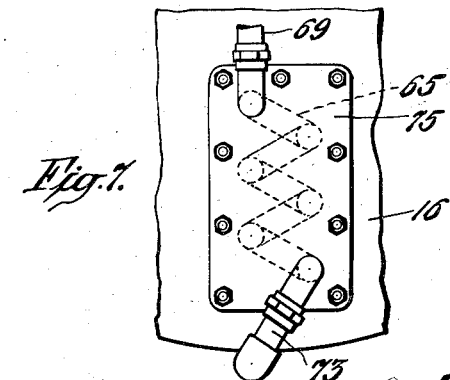

In the accompanying drawings illustrating the preferred form of the invention, Fig. 1 is a longitudinal, vertical section through one form of the improved sterilizing and pasteurizing apparatus; Fig. 2 is a cross section on an enlarged scale, taken on the line 2—2 of Fig. 1; Fig. 3 is a diagrammatic sketch to illustrate the action of the baffles in stirring up the milk while it is under treatment; Fig. 4 is a diagrammatic view to illustrate the method of introducing the milk into the apparatus; Fig. 5 is a view similar to Fig. 1, of a modified form of apparatus; Fig. 6 is a section, on an enlarged scale, taken on the lines 6—6 of Fig. 5; Fig. 7 is a detail of a portion of one end of the apparatus shown in Fig. 5; Fig. 8 is a view similar to Fig. 1, of another modified form of apparatus; Fig. 9 is a cross section of the apparatus shown in Fig. 8; and Fig. 10 is an enlarged sectional view of one end of the apparatus shown in Fig. 8.

The form of apparatus shown in Figs. 1 to 4 comprises a cylindrical tank or chamber in which the liquid is subjected to the various steps of sterilizing and pasteurizing the milk under vacuum and then cooling it. The treating chamber consists of two shells, an inner shell 15, which constitutes the treating chamber proper, and an outer shell 16 which serves as a jacket for the inner shell, the two shells being separated by the space 17, which with the outer shell 16 serves as a jacket for the chamber 15. The treating chamber is mounted to rotate and for this purpose the ends of the chamber are provided with hollow trunnions 18 and 19 journalled in the upright bearings 20 and 21. On trunnion 19 is mounted a pulley 23 which may be driven from any convenient source of power.

The valve 25, which leads into the inner chamber 15, is adapted to be connected with a pump which will produce a vacuum as high as 29.9 inches in the chamber, that is to say, the highest vacuum obtainable with commercially available pumps. The milk or other fluid is fed into the chamber through the valved nozzle 26, the discharge end of which is located adjacent a baffle plate or vane 27 which is secured to the inner surface of the chamber 15 and extends throughout the length thereof. The baffle plate 27 is directed at an acute angle to the adjacent side of the chamber 15 so as to form a pocket therewith, and is made in two sections so as to be adjustable inwardly of the chamber to control the size of the pocket. This baffle plate 27 performs a double function. During the introduction of the milk into the chamber 15, while the latter is stationary, the baffle plate by its proximity to the discharge end of the nozzle 26 prevents the milk from reaching the valve 25 and be sucked out with the outgoing air. It will be understood, of course, that as soon as the milk enters the chamber 15 it breaks up into a spray and when it hits the baffles it breaks into a fine spray, and in this connection it is desirable that the liquid to be treated be cold enough to prevent its going into a vapor and so be drawn out with the air under the high vacuum. As the spray falls to the lower part of the chamber the droplets accumulate as a body of milk indicated at 28.

The second function performed by the plate or vane 27 is that of stirring up or agitating the milk during the rotation of the treating chamber, which has a rate of travel preferably of about 10 to 15 revolutions per minute. In Figs. 2 and 3 the milk indicated at 28 is shown in a quiescent state. It can be assumed that in Fig. 2 the apparatus is stationary and is about to begin to rotate, whereas in the diagrammatic showing of Fig. 3 the treating chamber is rotating and that consequently although the milk is indicated as quiescent and having a level surface, it is in reality in a state of agitation caused by the passage of the vane 27 therethrough. The pocket formed by the vane 27 with the adjacent inner surface of the chamber 15 picks up the milk as the chamber rotates, and then drops the milk down into the center of the chamber and into the milk at the bottom thereof, as indicated in Fig. 3. To increase the violent agitation of the milk so as to bring all parts thereof into contact with the inner surface of the chamber 15, three additional longitudinally-arranged vanes 30 are provided at the inner surface of the chamber. These vanes 30 are separated a short distance from the inner surface of the chamber so that the milk can pass between the two, as indicated by the arrows at the bottom of Figs. 2 and 3, thereby increasing the slippage of the milk against the inner surface of the chamber.

The steam or other heating medium enters the space 17 between the inner and outer shells 15 and 16 through a pipe 32 which is supported at its lower end from a bracket 33 projecting from the upright 21. The upper end of the bracket 33 is hollow and receives at its inner end the outer end of a pipe 34 which passes through the hollow trunnion 19 and is connected by the pipe section 35 with the longitudinally-arranged pipe 36 secured along the outer surface of the shell 16. The heating fluid finds its way into the space 17 through the holes 38. The condensate passes through the holes 39 in the opposite side of the shell into a pipe 40, similar to pipe 36, arranged along the outer surface of the shell 16. The pipe 40 connects by the pipe section 42 with a pipe section 43 located in the hollow trunnion 18. The outer end of the section 43 is located in the inner end of the hollow head of the bracket 44 projecting from the upright 20. In the outer end of the bracket 44 is supported the upper end of a pipe section 45 which leads to a receptacle for the condensate and also for the water used for cooling the treating chamber which is admitted into the space 17 through the pipe 47 which connects at its lower end with the T with which the lower end of the pipe 32 is connected. The inner ends of the heads of the brackets 33 and 44 are provided with a gland 48 so as to make a tight joint at this point to prevent leakage during the turning of the pipe sections 34 and 43 with the chambers. These pipe sections are supported in the trunnions 18 and 19 by collars 49.

The various parts of the apparatus described above are provided with the usual instruments:— In the steam pipe 32 is a gage 51. At one end of the chambers to take the temperature of the milk therein is a thermometer 52. In the other end of the outer chamber is a safety valve 53 and a pressure gage 54. In the pipe 45 is a thermometer 55 to indicate the temperature of the condensate and the cooling water.

In the operation of the apparatus the chambers are brought to the position indicated in the diagrammatic sketch of Fig. 4. The valve 25 is connected with the vacuumizing means and turned to open position. When the requisite high vacuum has been attained in the chamber 15 the valve of the nozzle 26 is opened to admit the milk or other liquid to be treated. The incoming spray of milk hits the baffle or vane 27 and then falls down into the bottom of the chamber where it gathers in mass form. When the requisite quantity of liquid has been admitted into the chamber, about one-third or one-half of the capacity of the chamber, the valves 25 and 26 are shut off and disconnected from the vacuumizing means and the source of milk, which may be kept at atmospheric pressure or under vacuum. The chambers are now rotated a few times in order to break up the milk by agitation into small particles and thereby expose them to the vacuum in the chamber 15. The apparatus is then again brought to the position shown in Fig. 4, the connection with the vacuumizing means made and the valve 25 opened in order to draw out any air remaining in the chamber 15. The valve 25 is now closed and disconnected from the vacuumizing means and then the apparatus is again rotated. At this point the valve 57 in the pipe 32 is opened to admit steam or other heating medium into the space 17 between the inner and outer shells enclosing the treating chamber. When the desired sterilization has been effected in the contents of the treating chamber, which may take from a few seconds to about 30 minutes, the valve 57 is closed and the valve 58 in the pipe 47 is opened to admit water or other cooling medium into the space 17.

Although when the heating step of the method has been completed the interior of the chamber is under pressure, the cooling of the chamber 15 soon causes the vapor in the chamber to condense and be replaced by the vacuum so that the cooling is accomplished under the same high vacuum as the milk is under when the heating step starts. When the milk has been sufficiently cooled for storing or filling into containers, that is, from about 40° F. to 130° F. the valve 58 is closed and the apparatus brought to such position that the discharge valve 59 will be at the bottom of the apparatus so that the milk may be entirely drained from the chamber 15. The valve 59 is adapted to be connected with the receptacle or container receiving the milk, and is then opened and the milk drained off. In one side of the apparatus is the customary manhole 60 for giving access into the interior of the treating chamber so that it may be cleaned.

In the form of apparatus illustrated in Figs. 5, 6 and 7, modified treating and stirring or agitating means are shown. In other respects this form of apparatus is the same as the apparatus shown in Figs. 1 to 4, and the corresponding or same parts will be given the same reference numerals. In this modification more intensive heating and cooling are effected by the use of a coil of pipe 65 located within the treating chamber and supported therein by the brackets 66 and 67. The coils of the pipe are arranged in staggered relation as indicated by the lines 65 in Figs. 6 and 7. The treating fluid, that is to say, the heating fluid and the cooling fluid are admitted into the uppermost section 68 of the coil of pipe 65 through the pipe section 69 connected by a T 70 with the pipe section 34 leading from the steam pipe 32 and water pipe 47. The condensate and water are discharged from the coil of pipe through the lowest section 72 which connects through the pipe section 73 with the pipe 40 secured longitudinally on the outer surface of the outer shell 16. The opening 74 through which the coil of pipe 63 is slide into the treating chamber and through which the top pipe section 68 and lower pipe section 72 project from the treating chamber to connect with the pipe sections 69 and 73, is closed by a plate 75.

In operation this form of apparatus is exactly the same as that shown in Figs. 1 to 4, except that the coil of pipe 65 aids not only in the heating and cooling of the liquid contained in the treating chamber but also performs the function of stirring or agitating the milk performed by the baffle plate or vane 27. Since the coil of pipe 65 adds considerable heating and cooling surface to that afforded by the outer surface of the inner shell 15 the time required to heat and cool the liquid is considerably reduced. And since the coil of pipe 65 takes the place of the baffle plate 27 it is necessary to provide an auxiliary plate 77 against which the nozzle 26 discharges into the treating chamber.

In the form of the invention shown in Figs. 8, 9 and 10 the outer shell or drum 80 is stationary and rests on the supports 81 and 82. The inner shell or treating chamber 83 rotates and at its outer ends is provided with the trunnions 84 and 85 journalled in the bearing boxes 86 extending outwardly from the center of the outer ends of the stationary shell 80. Leakage from the jacket or space 88 outwardly through the bearings 86 is prevented by the glands 89. On the outer end of the trunnion 84 is mounted the pulley 91 for turning the treating chamber 83. The vacuum is drawn in the chamber 83 through the pipe 92 located in the chamber and the pipe 93 located in the trunnion 84. The outer end of the pipe 93 is provided with the elbow 94 adapted to be connected with the vacuumizing means. The milk or other liquid is introduced into the treating chamber through the pipe 96 located in the chamber and the pipe 97 located in the trunnion 85. The discharge end of the pipe 96 is located adjacent the inner surface of the chamber and in order that the entering milk may not be drawn to the inlet opening of the pipe 92 the baffle 98 is provided near the pipe 96. The pipes 97 and 93 are provided, respectively, with a valve in the elbows 99 and 100 where they join with the pipes 96 and 92. In Fig. 10 this valve is shown in enlargement and consists of a tapered valve 102 mounted on the inner end of a rod 103 operated by a handle 105. When the apparatus is connected with the vacuumizing means and with the source of liquid supply the valves 102 in heads 99 and 100 are unseated.

In the operation of this form of apparatus the steps of the new method are followed in exactly the same way as in the two preceding forms of apparatus, that is to say, as perfect a vacuum as possible is drawn in the rotating chamber 83, then the handle 107 of the valve controlling the milk pipes 96 and 97 is turned to permit the proper amount of milk to enter the chamber. The handle 107 is then turned to closed position and the valve 102 is closed, after which the pipes 97 and 93 are disconnected respectively from the source of milk and the vacuumizing means. The chamber 83 is then rotated a few times and stopped and the pipe 93 is again connected with the vacuumizing means and the valve 102 opened to draw out the remaining air in the chamber 83, after which valve 102 is closed and the pipe 93 disconnected from the vacuumizing means. The chamber 83 is now rotated the requisite length of time during the admission of the steam or other heating medium into the space 88 from the pipe 108 which is connected with the longitudinal pipe 109 fixed longitudinally against the outer surface of the outer shell 80. The fluid from the pipe 109 enters the space 88 through the openings 110. The condensate passes through the openings 112 in the opposite side of the drum into the discharge pipe 113. After the liquid has been heated to the requisite temperature for the proper length of time, depending upon the material under treatment and the sterilization required, cold water is admitted from the pipe 106 into the pipe 109 to bring the liquid in the chamber 83 down to the desired temperature.

When the chamber 83 has been brought to a standstill with the pipe 114 in a vertical position over the indentation 116 in one end of the drum 83, the valve 117, corresponding to the valve 102, and mounted on the inner end of the rod 118 located in the pipe 119 connected by the head 120 with the pipe 114, is opened to permit the escape of the milk through the pipe 119, the nipple 121 of which is adapted to be connected with the receptacle to which the milk is to be delivered. The valve 117 is operated by the handle 122. The milk is discharged from the chamber 83 by admitting into the chamber a compressed neutral gas, such as carbon dioxide, through the valve 102.

In this form of apparatus as in the form shown in Figs. 5, 6 and 7, the speed in heating and cooling the liquid is increased by providing a series of U-shaped pipes 124 extending the length of the chamber 83 and communicating with the space 88, as shown in Fig. 9. Incidentally, this series of pipes aids in stirring and agitating the milk and are auxiliary to the vanes 125 which have the same construction as the vanes 27 and 30 in Fig. 1.

In the inner ends of the heads 100 and 120 are openings or vents 136 and 137, respectively. The function of these vents is to prevent the formation of pockets of untreated milk or other liquid in the inner ends of the pipes 92, 114 and 96 as they rotate with the chamber 83. While the chamber 83 is being vacuumized, and also while the compressed air is being admitted thereto, it is desirable to close the vent 136 so that the action in question will be effected through the outer end of the pipe 92. Accordingly on the innermost end of the rod 103 is mounted a valve 128 for closing the vent 136 when the valve 102 is open. In like manner it is desirable when the valve 117 is open to permit the discharge of milk through the pipe 119, to close the vent 137 to prevent the gas forcing the milk out of the chamber 83 through the pipe 114 from entering the head 120 and so acting against the passage of the milk through the pipe 114. For this purpose a valve 129 is mounted on the innermost end of the rod 118, arranged to close the vent 137 when the valve 117 is open. Both valves 128 and 129 will be closed during the emptying of the chamber, but during the vacuumizing of the chamber only valve 128 will be closed, since at this time valve 117 will be closed.

This form of apparatus is provided with the usual instruments:—The thermometer 130 in the trunnion 84 and the thermometer 131 in the trunnion 85 to measure the temperature of the liquid being treated; the safety valve 132 and the pressure gage 133 in the outer shell 80; the pressure gage 134 in the steam pipe 108 and the thermometer 135 in the discharge pipe 113.

We claim as our invention:—

1. An apparatus for heating and cooling liquids under vacuum comprising a jacketed cylindrical rotatable chamber, said chamber being provided with connections whereby a vacuum may be drawn in the chamber, a vane located in the chamber and extending throughout the length thereof, a pipe connection for liquid passing through the shell of the chamber and directed against the vane with the vane separating the vacuum producing means and the liquid supply pipe, the vacuum connections and liquid supply pipe being located at one side of the longitudinal axis of the chamber whereby the chamber may be vacuumized and substantially filled with liquid to a level above the longitudinal axis when at rest without submerging the vacuum connections and liquid supply pipe in the liquid, pipe connections for introducing heating and cooling media into the jacket of the chamber, and means for rotating the chamber.

2. In an apparatus for heating and cooling liquids under vacuum, a rotating chamber provided with means for connecting with vacuumizing means, means for the introduction of liquid into the chamber, and a series of fixed vanes attached to the inner surface of the chamber and forming an acute angle therewith for agitating the liquid as the chamber rotates with at least one of the vanes constituting a baffle and arranged between the vacuumizing means and the liquid introduction means, the vacuumizing and liquid introduction means being located at one side of the longitudinal axis of the chamber whereby the chamber may be vacuumized and substantially filled with liquid to a level above the longitudinal axis when at rest without submerging the vacuum connections and liquid supply pipe in the liquid.

3. An apparatus for heating and cooling liquids under vacuum comprising a rotating chamber provided with means for connection with vacuumizing means, a nozzle passing through the shell of a chamber and having its outlet located in the chamber, means opposite the outlet of the nozzle for deflecting the liquid passing into the chamber, and means secured to the inner surfaces of the chamber so as to rotate with the chamber and thereby agitate the contents of the chamber, the vacuumizing connection means and the nozzle outlet being located at one side of the longitudinal axis of the chamber and adjacent the side wall thereof whereby the chamber may be vacuumized and substantially filled with liquid to a level above the longitudinal axis when at rest without submerging the vacuum connections and the nozzle outlet in the liquid.

4. An apparatus for heating and cooling liquids under vacuum comprising a stationary outer chamber, bearings provided at the ends of the outer chamber, a rotary chamber located in the outer chamber, said rotary chamber being provided with trunnions at its ends journalled in the bearings on the outer chamber, an inlet pipe for introducing liquid into the chamber passing through the trunnion at one end of the inner chamber, and having its discharge end located relatively close to the inner surface of the rotary chamber, a baffle plate secured to the inner surface of the rotary chamber adjacent to the discharge opening of the inlet pipe, a pipe located in the trunnion at the other end of the rotary chamber and adapted to be connected with vacuumizing means, a second or discharge pipe located in said second trunnion, said pipes being provided with double acting valves, one of said valves opening into the chamber and the other of said valves opening into the pipe.

5. An apparatus for heating and cooling liquids under vacuum comprising a jacketed cylindrical movable chamber, said chamber being provided with connections whereby a vacuum may be drawn in the chamber, a vane secured to the inner surface of the chamber and projecting toward the center thereof, auxiliary vanes of less width than the first vane secured to the inner surface of the chamber and being spaced therefrom to permit the passage of liquid between the auxiliary vanes and the surface of the chamber, a pipe connection for liquid passing through the shell of the chamber and directed against the first vane at the side opposite the vacuum connections, the vacuum connections and the liquid supply pipe connecting with the chamber at the same side of the longitudinal axis of the chamber whereby the chamber may be vacuumized and substantially filled with liquid to a level above the longitudinal axis when at rest without submerging the vacuum connections and liquid supply pipe in the liquid, pipe connections for introducing heating and cooling media into the jacket of the chamber, and means for rotating the chamber.

6. An apparatus for heating and cooling liquids under vacuum comprising a jacketed cylindrical movable chamber, said chamber being provided with connections whereby a vacuum may be drawn in the chamber, a pipe connection for liquid arranged to enter the chamber, a baffle located opposite the discharge opening of the pipe connection and against which the liquid entering the chamber strikes before it drops down into the bottom of the chamber, the vacuum connections and the liquid supply pipe connecting with the chamber at the same side of the longitudinal axis of the chamber whereby the chamber may be vacuumized and substantially filled with liquid to a level above the longitudinal axis when at rest without submerging the vacuum connections and the liquid supply pipe in the liquid, pipe connections for introducing heating and cooling media into the jacket of the chamber, and means for rotating the chamber.

7. An apparatus for heating and cooling liquids under vacuum comprising a stationary outer chamber, a rotary chamber having end trunnions for journalled mounting in the end walls of the stationary outer chamber, an inlet pipe for introducing liquid into the chamber, passing through an end trunnion and a pair of pipes passing through the other trunnion with one of said pipes adapted to be connected with vacuumizing means and the other of said pair of pipes constituting an outlet for fluid from the chamber, and a control valve for each of said pipes opening into the chamber.

WALTER PAGE.
BURT E. TAYLOR.